June 18, 1968
R. D. MacDONALD
3,388,500
SLIDING PANEL ASSEMBLY
Filed March 7, 1966
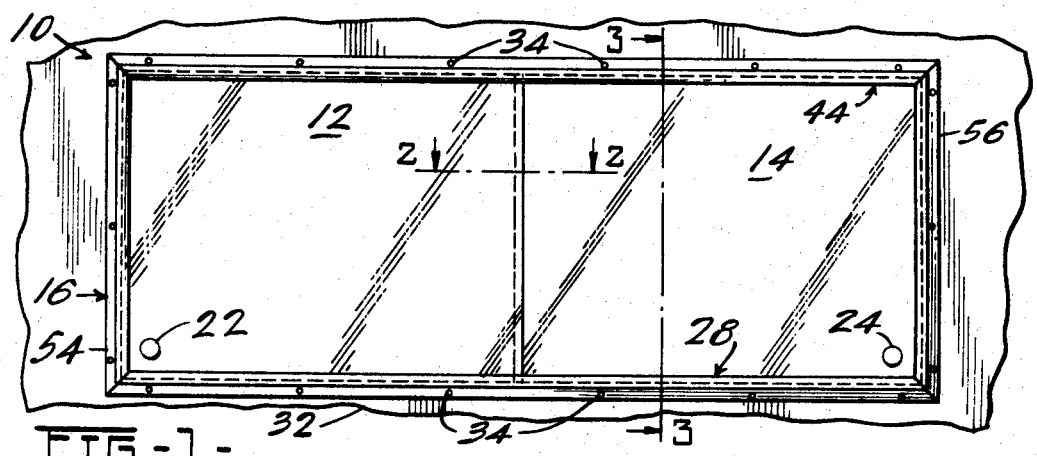
FIG-1-
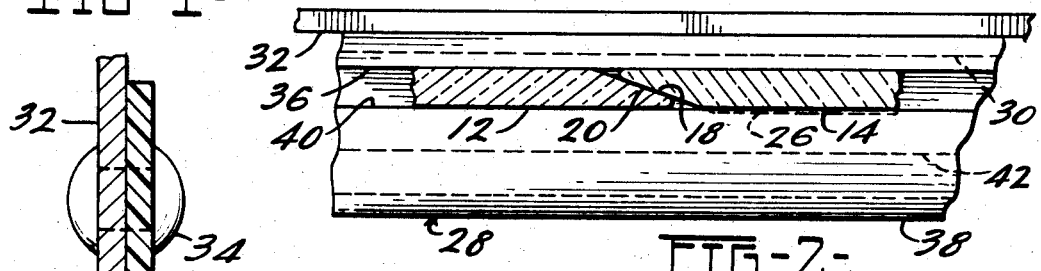
FIG-2-
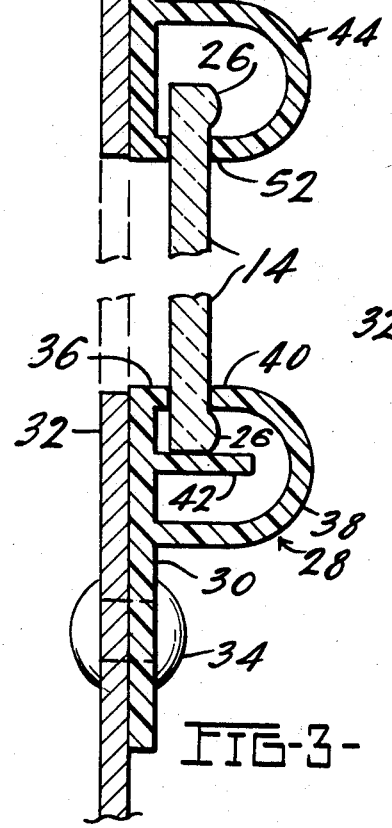
FIG-3-
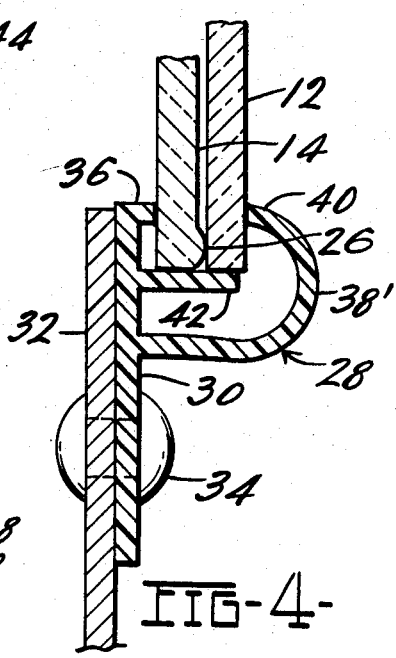
FIG-4-
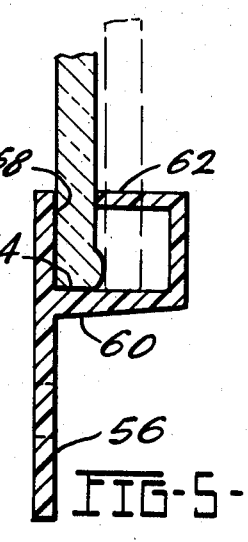
FIG-5-
INVENTOR:
Robert D. MacDonald
BY
Owen & Owen
ATT'YS.

United States Patent Office 3,388,500
Patented June 18, 1968

3,388,500
SLIDING PANEL ASSEMBLY
Robert D. MacDonald, Tecumseh, Mich., assignor to Cardinal of Adrian, Inc., Adrian, Mich., a corporation of Michigan
Filed Mar. 7, 1966, Ser. No. 540,444
10 Claims. (Cl. 49—130)

ABSTRACT OF THE DISCLOSURE

A low-cost sliding winding for a travel trailer includes lightweight, shatter-proof plastic panels and a lightweight, low-cost extruded plastic frame. One of the panels has ridges extending longitudinally thereof at the upper and lower edges to space the adjacent surfaces of the panels and prevent scratching. The edges of the panels are beveled and, when closed, are in contact throughout their lengths to provide a substantially transparent yet reasonably tight joint. The track arrangement for the panels includes extruded, plastic elements, the lower one of which has a resilient, integral track flange which urges the transparent panels toward a common plane.

---

This invention relates to a sliding panel assembly and particularly to a sliding window having a single resilient track for two sliding panels which lie in co-planar relationship, when closed.

The panel assembly according to the invention is particularly advantageous when in the form of a sliding window. For this application, the panels of the window preferably have beveled edges which are in contact when the panels are closed and in co-planar relationship so as to form only a single thin meeting line which interferes a minimum with light and the view through the window. In a preferred form, the panels are made of light-transmitting plastic material with one of the panels having a projection molded therein to contact the other panel and prevent the major adjacent surfaces from coming into contact as the panels are moved side-by-side toward open and closed positions.

The frame of the panel assembly or window includes a resilient single track which enables the width of the frame to be maintained at a minimum and keeps the cost of the frame low. The single track, which is not exposed at all when the panels are in co-planar relationship, also catches a minimum amount of dirt, etc. which would otherwise block movement of the panels and necessitate frequent cleaning.

In summary, the invention comprises a sliding panel assembly including a frame having a top frame member, a lower frame member, and two side frame members, each of which is made of one-piece, extruded plastic material; two panels, one of which has spacing means extending toward the other to space apart the adjacent surfaces; the lower frame member comprising a supporting member, and a resilient supporting flange extending from the supporting member and terminating in a track flange spaced from the member; the side frame members each including a supporting member having a supporting flange terminating in a track flange; and the upper frame member comprising a supporting member extending outwardly. The panels have beveled vertical edges which are in contact with one another when the panels are in co-planar relationship to provide a substantially transparent joint when the panels are transparent.

It is, therefore, a principal object of the invention to provide an improved sliding panel assembly.

Another object of the invention is to provide an improved sliding panel assembly having at least two sliding panels and a frame with a single resilient track for both panels.

Yet another object of the invention is to provide a sliding panel assembly in which the panels lie in co-planar relationship when in closed positions.

A further object of the invention is to provide a sliding panel assembly in which one of the panels has integral projecting means for spacing apart the major surfaces of the panels.

Still a further object of the invention is to provide a sliding window in which the meeting line of the window panels, when closed, provides minimum obstruction to light and the view.

Other objects and advantages of the invention will be apparent from the following detailed description of preferred embodiments thereof, reference being made to the accompanying drawing, in which:

FIG. 1 is a view in elevation of a sliding panel assembly embodying the invention;

FIG. 2 is an enlarged, fragmentary view in horizontal cross section taken along the line 2—2 of FIG. 1;

FIG. 3 is an enlarged, fragmentary view in vertical cross section taken along the line 3—3 of FIG. 1;

FIG. 4 is a view in cross section of a lower frame member shown in FIG. 3 with the panels opened, in side-by-side relation;

FIG. 5 is a view in vertical cross section similar to the lower portion of FIG. 3 of a slightly modified frame member.

A sliding panel assembly according to the invention can be used for many applications, such as for sliding doors for cabinets, but has particular usefulness when in the form of a sliding window. The construction of the panel assembly enables the meeting line between the panels to be very thin and be a minimum obstruction for the window. More specifically, the sliding window has particular advantages when used in a trailer. Especially for a travel trailer, the light-transmitting panels can be of shatter-proof plastic material to minimize injuries in case of accidents. The plastic panels and thin frame also achieve a lightweight construction which is especially suitable for trailers where weight is an important factor.

In FIG. 1, a sliding panel assembly according to the invention is indicated at 10 and includes two sliding panels 12 and 14 and a frame 16. Referring particularly to FIG. 2, the panels have beveled edges 18 and 20 which meet in overlapping relationship when the panels 12 and 14 are closed in co-planar relationship. The edges form an effective seal against the weather and yet provide a single, narrow meeting line between the two panels. The beveled edges 18 and 20 also enable one or both panels to open more easily when pushed toward one another by suitable handles 22 and 24 (FIG. 1) mounted toward the outer edges of the panels.

As shown in FIGS. 3 and 4, one of the panels, the panel 14 in this instance, has projections in the form of horizontal ridges 26 at the upper and lower longitudinal edges, with these ridges extending toward and contacting the panel 12 when the two panels are in side-by-side relationship. As shown in FIG. 4, the ridges prevent the adjacent major surfaces of the panels 12 and 14 from coming into contact and abrading or scratching.

Referring particularly to FIG. 3, a lower frame member 28 of the frame 16 includes a main supporting member or plate 30 forming a mounting flange, in this instance, at a lower portion thereof. The supporting member 30 can be attached to a wall 32 of the trailer by suitable fasteners or rivets 34. The particular manner in which the frame is mounted on or attached to an existing wall can vary widely, of course, depending on the particular application.

A first track flange or guide 36 extends from an upper portion of the supporting member 30 to form one side edge of the groove or track for the panels 12 and 14. A supporting flange 38 extends outwardly from an intermediate portion of the supporting plate 30 and curves around in a reversed C-shape configuration, as shown, terminating in a second track flange or guide 40. The supporting flange 38 is resilient and supports the second track flange 40 in a resilient manner to enable the flange to move inwardly and outwardly relative to the first track flange 36. When the supporting flange 38 is in a normal or unstressed position, the track flange 40 is spaced from the first track flange 36 a distance approximately equal to the thickness of one of the panels 12 or 14. Preferably the distance is slightly less than the thickness of the panel so that the flanges 36 and 40 hold the panel in relatively snug, yet slidable, relationship to prevent rattling and also to provide resistance to weather.

Stop means are also embodied in the lower frame member 28, with the stop means in this instance being in the form of a stop flange 42 extending outwardly from the supporting plate 30 a predetermined distance below the flanges 36 and 40, and extending outwardly substantially beyond the second track 40 when in its normal position. The spacing between the track flanges and the stop flange is sufficient to enable the entire ridge or projection 26 of the panel 14 to be below the track flanges and out of sight. In this manner, the ridges or projections cannot obstruct the view through the window. The width of the stop flange 42 should be sufficient to support both of the panels 12 and 14 when the window is open.

When one of the panels 12 or 14 is slid into adjacent relationship with the other to open the window, the second track flange 40 is moved outwardly so that the first and second track flanges 36 and 40 are then spaced apart a distance substantially equal to the sums of the thicknesses of the panels 12 and 14 and the extent of the projection of the ridge 26. Otherwise, the flanges are always in contact with both sides of the panels and there is no exposed groove to collect dirt and the like when the window is closed and the panels are in co-planar relation. This arrangement also achieves a smooth, neat appearance for the panel assembly with no protruding track or excessively projecting frame to detract from the appearance.

An upper frame member 44 is quite similar to the lower frame member 28 except for the deletion of the stop means. As shown, the upper frame member 44 includes a supporting member or plate 46 which can also have a mounting flange portion to secure the upper frame member to the wall 32. A first track flange or guide 48 extends outwardly from a lower edge portion of the supporting member 46 while a supporting flange 50 extends outwardly thereabove and terminates in a second track flange or guide 52.

The flange 52 is spaced apart from the flange 48 a distance substantially equal to or slightly less than the thickness of the panel 14, and the flange 52 moves outwardly when the window is opened and the panels 12 and 14 are moved into side-by-side relationship. No stop flange is required for the upper frame member since this member merely supports the panels transversely and not vertically. Without the stop flange, the window panels can be assembled with the frame after the frame is mounted. This is accomplished by inserting the upper edges of the panels 12 and 14 into the upper frame member 44 to the maximum extent. The lower edges of the panels are then aligned with the grooves of the lower track member 28 and inserted therein.

Side frame members 54 and 56 of the frame 16 can be similar to either the lower frame member 28 or the upper frame member 44, but preferably are similar to the lower frame member 28, including the stop flange 42. This flange enables the position of the panels 12 and 14 to be accurately determined when closed, so that the beveled edges 18 and 20 properly overlap in contacting relation. For the side frame members, the second track flanges or guides need not necessarily be resilient since it is not essential that the side frame members receive both panels when the window is opened.

A slightly modified frame member 54 is shown in FIG. 5, this frame member being suitable for all four sides of a frame, if desired. The frame member 54 includes a supporting member or plate 56 which also can be mounted in or on a wall (not shown) by suitable fasteners. An upper edge portion of the supporting member 56 constitutes a first track flange or guide 58. A supporting flange 60 extends outwardly from an intermediate portion of the plate 56 and terminates in a second track flange 62. A portion of the supporting flange 60 adjacent the plate 56 is thicker than the outer portion toward the flange 62. In this manner, an upper, flat surface 64 of the supporting flange 60 constitutes stop means for the panels 12 and 14. At the same time, the outer, thinner portion of the supporting flange 60 provides the desired resiliency for the second track flange 62 to enable the flange 62 to move in and out relative to the flange 56 to accommodate one or both panels, as before. The frame member 54 thus has the advantages of the frame member 28 but without the additional flange for the stop means.

A window construction as described above has many advantages. As noted, the frame members present a minimum exposure of the window track to minimize the chance for dirt, etc. to collect therein and block movement of the window panels, thus requiring relatively frequent cleaning. Of particular importance, the entire window assembly, particularly for trailers, can be easily installed in a wall and provides lightweight safety panels for the windows at relatively low cost. The frame members themselves also are lightweight, thin, and are relatively inexpensive to produce, preferably being of extruded plastic material.

The panels 12 and 14 provide a thin meeting line when closed and yet achieve a reasonably weathertight construction. The built-in spacers in the form of the ridges 26 also constitute a reliable and low cost arrangement for separating the major surfaces of the panels when in side-by-side relationship. Since the projections are integral, no additional assembly step is required and the projections cannot vibrate loose and malfunction or be lost.

Various modifications of the above-described embodiments of the invention will undoubtedly be apparent to those skilled in the art. It is to be understood that such modifications which meet the objects and advantages of the instant invention are within the scope of the present invention, if within the spirit and tenor of the depending claims.

I claim:

1. A sliding window comprising a frame including a top frame member, a lower frame member, and two side frame members, two light-transmitting panels, one of said panels having ridge means integral therewith, located parallel to the direction of sliding movement of the panels near the upper and lower longitudinal edges thereof, and extending over substantially the entire length of said one panel, said ridge means projecting toward the other panel to maintain the major adjacent surfaces of said panels in spaced relationship when the window is open, said lower frame member comprising a supporting member, a first track flange extending from said supporting member, a resilient supporting flange extending from said supporting member and terminating in a second track flange in opposed relation to said first track flange, with the edges of said track flanges spaced apart approximately the thickness of one of said panels when said supporting flange is in a substantially unstressed position, and a stop flange extending outwardly from said supporting member and spaced a predetermined distance below said first and second track flanges to constitute a stop and support for a panel extending downwardly between the edges of said track flanges, said ridge means at the lower edge of said one panel being below said first and second track flanges.

2. A sliding window according to claim 1 wherein each of said side frame members comprises a supporting member, a first track flange extending from said supporting member, a supporting flange extending from said supporting member and terminating in a second track flange in opposed relation to said first track flange, with the edges of said track flanges apart approximately the thickness of one of said panels, and a stop flange extending outwardly from said supporting member and spaced a predetermined distance below said first and second track flanges to constitute a stop for a panel extending between the edges of said track flanges.

3. A sliding window according to claim 1 wherein said top frame member comprises a supporting member, a first track flange extending from said supporting member, a supporting flange extending from said supporting member and terminating in a second track flange in opposed relation to said first track flange, with the edges of said track flanges spaced apart approximately the thickness of one of said panels when said supporting flange is in a substantially unstressed position.

4. A sliding panel assembly comprising two light-transmitting plastic panels, ridge means integral with one of said panels along upper and lower longitudinal edges thereof to contact the other panel and maintain the adjacent surfaces thereof in spaced relation when said panels are not in co-planar relationship, frame means for said panels including a lower frame member of one-piece, extruded material and comprising supporting means forming a first track guide, integral means connected to said supporting means forming a second track guide and resiliently supporting said second track guide in spaced relationship to said first track guide, with the distance between said track guides being substantially no greater than the thickness of one of said panels when said resilient means is unstressed, wherein said track guides can move apart a distance at least equal to the thicknesses of both panels when said panels are in side-by-side relationship.

5. A sliding panel assembly comprising two light-transmitting panels, each of said panels having a vertical beveled edge with said edges being parallel with one another and in contact with one another over the entire lengths and substantial portions of the widths when said panels are closed and in co-planar relationship, said edges constituting the sole joint and area of contact between said panels, when closed, and frame means including a lower frame member having structurally integral resilient means urging said panels into co-planar relationship when said panels are moved to closed positions 6. A sliding panel assembly according to claim 5 characterized by one of said panels having projecting means extending toward the opposite panel when in side-by-side relationship to maintain the major surfaces of said panels in spaced relationship.

7. A sliding panel assembly comprising two panels, a top frame member, a lower frame member, and two side frame members, said lower frame member being of one-piece, extruded plastic material and comprising a supporting member, a resilient supporting flange extending from said supporting member and terminating in a track flange spaced from said member a distance not exceeding approximately the thickness of one of said panels when said supporting flange is in a substantially unstressed position; each of said side frame members comprising a supporting member, and a supporting flange extending from said supporting member and terminating in a track flange in spaced relation to said side frame supporting member; and said top frame member being of one-piece, extruded plastic material and comprising a supporting member, a supporting flange extending from said supporting member and terminating in a track flange spaced from said top supporting member a distance not exceeding approximately the thickness of one of said panels when said supporting flange is in a substantially unstressed position.

8. A sliding panel assembly according to claim 7 wherein said panels are light-transmitting 9. A sliding panel assembly according to claim 7 characterized by one of said panels having integral projecting means extending toward the other panel to maintain major surfaces of said panels in spaced relationship when said panels are side-by-side.

10. A sliding panel assembly according to claim 7 characterized by said panels having beveled vertical edges which are parallel and in contact with one another over their entire lengths and substantial portions of their widths when said panels are closed and in co-planar relationship.

References Cited

UNITED STATES PATENTS

| 1,934,816 | 11/1933 | Randall | 49—441 XR |
| 2,602,501 | 7/1952 | Roos | 49—413 XR |

FOREIGN PATENTS

| 833,231 | 7/1938 | France. |
| 69,503 | 8/1945 | Norway. |

KENNETH DOWNEY, *Primary Examiner.*